No. 692,649. Patented Feb. 4, 1902.
A. T. FISCHER.
WEEDER AND THINNER.
(Application filed Apr. 26, 1901.)
(No Model.)
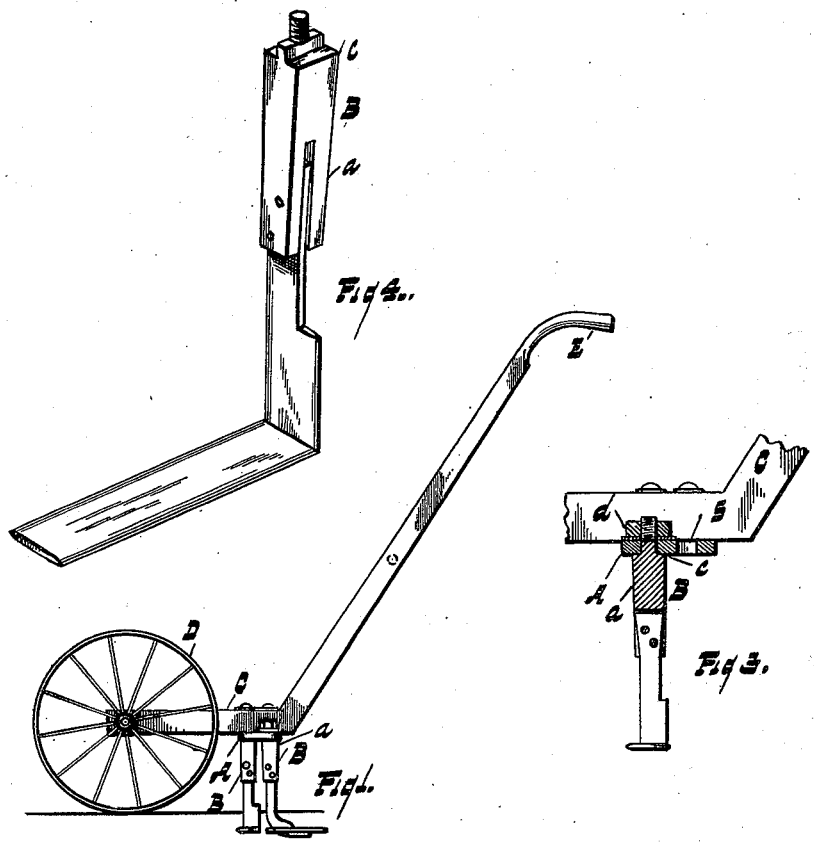
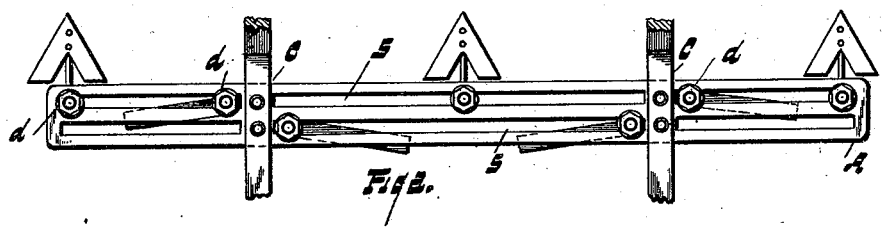
WITNESSES
J. G. Massey
May E. Kott
INVENTOR
Alexander T. Fischer,
By Parker & Burton,
Attorneys.

UNITED STATES PATENT OFFICE.

ALEXANDER T. FISCHER, OF DETROIT, MICHIGAN.

WEEDER AND THINNER.

SPECIFICATION forming part of Letters Patent No. 692,649, dated February 4, 1902.

Application filed April 26, 1901. Serial No. 57,578. (No model.)

*To all whom it may concern:*

Be it known that I, ALEXANDER T. FISCHER, a citizen of the United States, residing at Detroit, county of Wayne, State of Michigan, have invented a certain new and useful Improvement in Weeders and Thinners; and I declare the following to be a full, clear, and exact description of the invention, such as will enable others skilled in the art to which it pertains to make and use the same, reference being had to the accompanying drawings, which form a part of this specification.

This invention relates to weeders and thinners, and has for its object an improved wheeled implement adapted to be used as a wheeled hoe or a wheeled cultivator for cutting weeds or for stirring grounds.

In the drawings, Figure 1 is a side elevation. Fig. 2 is a plan of the toothed holding-bar. Fig. 3 is a section across the toothed holding-bar, showing the tooth in place. Fig. 4 is a perspective view of the cutting part of the tooth.

The implement comprises a tooth-holding bar A, which is preferably made of metal of two or more parallel bars, between which is a slot or slots extending from end to end of the bar, or preferably bridged at the junction with the handles, and in these slots are held the standards or shanks B of the cutting-hoes. To the upper side of the bar A are bolted the handles C, which extend forward and are provided at their forward extremities with wheel-holding axles for wheels D. The handles C also extend upward and backward and terminate with hand-grips E. Each tooth is provided with a shank $a$, at the upper end of which there is a rectangular projection rising from a shoulder $c$, and above this part threaded to receive a holding-nut $d$. The rectangular projection is arranged to engage through the slot S in the holding-bar, and inasmuch as these slots extend entirely across the implement lengthwise the bar a number of teeth may be secured in each slot, and they may be arranged and adjusted with reference to each other in almost any way that may be desired, so as to hold the hoe part of the teeth with cutting edge either to the front or to the rear and with any spacing between them that may be desired. The teeth may be of any approved style or shape.

Two shapes are shown in the drawings, one of which may be compared to a flat-bladed hoe and the other to a pointed hoe or small plow. The implement may be used as a hoe, in which case the operator would pull it toward himself, bearing down on the handles until the wheels prevent its further cutting into the ground, or the teeth may be turned around, and the implement will then be pushed from the operator.

I do not wish to confine myself to a hand implement, as the implement may be used with animal power by adding proper draft attachments to it.

What I claim is—

1. In an implement for weeding, the combination of a tooth-holding bar provided with parallel slots extending lengthwise the bar and across the implement, handles secured to the tooth-holding bar, extending forward and provided with axles, wheels mounted on the axles, a plurality of teeth, and means for securing each tooth adjustably in a slot of said bar, substantially as described.

2. In an implement for weeding, the combination of a bar provided with a slot extending lengthwise the bar, handles secured to the bar, extending forward and provided at their forward terminals with an axle, wheels mounted on said axle, a plurality of teeth adapted to be secured adjustably along said slot and means for securing the teeth, substantially as described.

In testimony whereof I sign this specification in the presence of two witnesses.

ALEXANDER T. FISCHER.

Witnesses:
CHARLES F. BURTON,
MAY E. KOTT.